UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, OF LONG ISLAND CITY, NEW YORK, A CORPORATION OF NEW JERSEY.

NON-HYDRATED MOISTURE-CONTAINING MANGANESE DEPOLARIZING COMPOUND.

1,228,359. Specification of Letters Patent. Patented May 29, 1917.

No Drawing. Application filed October 23, 1915. Serial No. 57,435.

*To all whom it may concern:*

Be it known that I, CARLETON ELLIS, a citizen of the United States, and a resident of Montclair, in the county of Essex and State of New Jersey, have invented certain new and useful Improvements in Non-Hydrated Moisture - Containing Manganese Depolarizing Compounds, of which the following is a specification.

This invention relates to depolarizers of the type suitable for use in dry batteries of the Leclanché type and especially in miniature pocket batteries intended for flash light purposes and relates particularly to artificial manganese dioxid substantially or entirely free from water of hydration and containing more or less adsorbed or occluded moisture.

It has been proposed to use artificial manganese dioxid in the hydrated form in spite of its acid character because of the good conductivity of such hydrated material, the high voltage developed by a battery using it and various other alleged advantages. The present invention is not directly concerned with such material but relates specifically to the use of substantially neutral manganese dioxid containing adsorbed or occluded moisture, instead of combined water giving a strongly acid tendency. Preferably a product containing one molecule of such occluded moisture to one or two molecules of the dioxid is employed and the depolarizing agent is mixed with graphite or other suitable carbonaceous agent capable of giving the necessary conductivity to the material. Contrary to expectation a relatively small amount of fine graphite serves to give a mix of very good conductivity. This mixture is formed into any desired shape preferably by molding about a cylindrical carbon electrode which is immersed in an exciting fluid such as ammonium chlorid solution carried in a container of zinc. Various other forms of manganese dioxid may be used with the composition or specific compound employed herein including other forms of artificial or natural manganese dioxid and various type of manganites, also graphite, coke or carbon in other forms, coarse or fine, may be admixed to the extent desired with the depolarizing agent.

The advantage of such depolarizing material free or substantially free from water of hydration is the lack of the more marked acid properties which the hydrated compound shows causing oftentimes local action which is undesirable. The present composition although containing moisture and having a texture of an open or porous nature enabling rapid depolarizing action to be brought about is nevertheless not of that more strongly acid tendency which is characteristic of ordinary hydrated manganese dioxid heretofore used.

With such depolarizing material containing adsorbed or occluded moisture there is moreover apparently less tendency for formation of gas causing rupture of the battery during its operation especially in the early stages of its use.

The manganese depolarizing material used in, or forming a part of the present invention, may be prepared by pouring a saturated solution of manganous sulfate into an excess of manganic sulfate in acid solution, which may be obtained by treating potassium permanganate with sulfuric acid. The product is thoroughly dried and forms a more or less spongy product which while not capable of any substantial degree of direct hydration has unusual adsorbing or occluding powers enabling a large amount of moisture to be taken up which apparently has a beneficial effect in promoting the activity of the depolarizing action. A product obtained by this illustrative procedure and having the open or porous and spongy nature referred to is distinctly different in its properties from mineral manganese dioxid and has depolarizing powers or activities substantially surpassing the latter.

What I claim is:—

1. A depolarizing agent for batteries of the Leclanché type comprising an intimate mix of graphite and non-acid artificial manganese dioxid containing adsorbed moisture.

2. A depolarizing agent for batteries of the Leclanché type comprising an intimate mix of carbon and neutral non-acid substantially non-hydrated artificial manganese dioxid containing adsorbed moisture.

3. A depolarizing agent for batteries of the Leclanché type comprising an intimate mix of carbon and neutral non-acid artificial manganese dioxid containing adsorbed moisture, the proportion of carbon being less than that of the dioxid.

4. A depolarizing agent for batteries of the Leclanché type comprising an intimate mix of graphite and non-acid artificial manganese dioxid containing occluded moisture and being substantially free from mineral manganese dioxid; the proportion of graphite being substantially less than that of the manganese dioxid.

5. A depolarizing agent for batteries of the Leclanché type comprising an intimate mix of graphite and neutral non-acid artificial substantially non-hydrated manganese dioxid containing occluded moisture and being substantially free from natural manganese dioxid; the proportion of graphite being substantially less than that of the manganese dioxid.

6. A depolarizing agent for batteries of the Leclanché type comprising an intimate mix of carbon and neutral non-acid artificial substantially non-hydrated manganese dioxid containing occluded moisture; the proportion of graphite being substantially less than that of the manganese dioxid.

7. A depolarizing agent for batteries of the Leclanché type which comprises substantially neutral non-acid artificial substantially non-hydrated manganese dioxid containing a substantial proportion of adsorbed moisture capable of enhancing the depolarizing activity of the manganese dioxid.

8. A depolarizing agent for batteries of the Leclanché dry type which comprises substantially non-acid artificial substantially non-hydrated manganese dioxid of an open porous texture, containing a substantial proportion of occluded moisture capable of enhancing the depolarizing activity of the manganese dioxid.

9. A depolarizing agent for batteries of the Leclanché type which comprises substantially non-acid artificial substantially non-hydrated manganese dioxid containing an occluded moisture in the ratio approximately of one molecule of water to two molecules of manganese dioxid.

10. A depolarizing agent which comprises a substantially neutral, artificial, spongy, substantially non-hydrated, higher oxid of manganese containing a substantial proportion of occluded moisture.

CARLETON ELLIS.